United States Patent
Vasetsky et al.

(10) Patent No.: US 9,942,323 B2
(45) Date of Patent: Apr. 10, 2018

(54) WORKLOAD MIGRATION ACROSS A HYBRID NETWORK

(71) Applicant: VELOSTRATA LTD., Netanya (IL)

(72) Inventors: Leonid Vasetsky, Zikhron Yaakov (IL); Ady Degany, Haifa (IL); Shahar Glixman, Kiryat Tivon (IL); Guy Yogev, Raanana (IL); Yaniv Ben-Ari, Kochav Yair (IL)

(73) Assignee: VELOSTRATA LTD., Netanya (IL)

( * ) Notice: Subject to any disclaimer, the term of this patent is extended or adjusted under 35 U.S.C. 154(b) by 0 days.

(21) Appl. No.: 15/595,767

(22) Filed: May 15, 2017

(65) Prior Publication Data

US 2017/0339225 A1 Nov. 23, 2017

Related U.S. Application Data

(60) Provisional application No. 62/340,447, filed on May 23, 2016.

(51) Int. Cl.
- *G06F 15/173* (2006.01)
- *H04L 29/08* (2006.01)
- *G06F 12/0862* (2016.01)

(52) U.S. Cl.
CPC ...... *H04L 67/1095* (2013.01); *G06F 12/0862* (2013.01); *H04L 67/1097* (2013.01)

(58) Field of Classification Search
CPC ............. H04L 67/1095; H04L 67/1067; G06F 12/0862
See application file for complete search history.

(56) References Cited

U.S. PATENT DOCUMENTS

| | | | | |
|---|---|---|---|---|
| 7,386,616 B1* | 6/2008 | Henzinger | .............. | G06F 9/505 709/226 |
| 9,304,889 B1* | 4/2016 | Chen | ................... | G06F 11/3452 |
| 2003/0028731 A1* | 2/2003 | Spiers | ..................... | H04L 49/90 711/147 |
| 2010/0250831 A1* | 9/2010 | O'Brien | .............. | G06F 11/3433 711/103 |
| 2013/0007088 A1* | 1/2013 | Alfredo | ................. | G06F 9/5066 709/201 |
| 2015/0058486 A1* | 2/2015 | Huang | .................... | H04L 47/70 709/226 |
| 2017/0034016 A1* | 2/2017 | Carroll | ................ | H04L 41/0813 |
| 2017/0220374 A1* | 8/2017 | Beveridge | ........... | G06F 9/45558 718/1 |

* cited by examiner

*Primary Examiner* — Krisna Lim
(74) *Attorney, Agent, or Firm* — Hickman Palermo Becker Bingham LLP (57) ABSTRACT

A method and system for workload migration across a hybrid network is provided. The method and system are directed to migrating a workload to a cloud by transferring the workload computing processes to the cloud, streaming workload data as necessary to execute the workload processes in the cloud, transferring the remaining workload data in a background process to cloud storage, and then completing migration by switching the primary data source of the workload computing processes to the cloud storage.

30 Claims, 8 Drawing Sheets

WORKLOAD MIGRATION ACROSS A HYBRID NETWORK

BENEFIT CLAIM

This application claims the benefit under 35 U.S.C. § 119(e) of provisional application 62/340,447, filed May 23, 2016, the entire contents of which are hereby incorporated by reference for all purposes as if fully set forth herein.

FIELD OF THE DISCLOSURE

The present disclosure generally relates to managing computer resources such as processors, memory and storage in distributed networks including virtual computing systems. The present disclosure relates more specifically to computer-implemented techniques for performing workload migration while maintaining workload data in a hybrid network, and even more specifically to an improved computer implemented method of migrating one or more workloads from a source computing device at a backend sub-network to a target computing device at a frontend sub-network while maintaining workload data across the hybrid network.

BACKGROUND

The average data center infrastructure is designed to handle an average load and is sometimes over-provisioned with computational and storage resources to handle some sort of peak load. However, when a new project comes in, the new project often requires upgrading the current infrastructure or adding additional infrastructure. Setting up new servers or upgrading old servers may take a significant amount of time. Additionally, migrating workloads to the additional infrastructure results in significant downtime.

Having the ability to migrate some workloads to one or more public "cloud" servers provides a cost efficient solution that avoids setting up new servers or upgrading old servers. However, the migration process still typically requires extensive up-front planning and significant downtime, especially in cases where there is a large amount of data to transfer.

Traditional workload migration includes a process of copying over data stored on-premises to cloud servers while simultaneously running a workload on-premises. Once the data is fully copied to the cloud servers, the data is synchronized and the workload execution context is transitioned to the cloud. Significant downtime is accrued and workload disruption is at its peak when performing data synchronization tasks and transitioning the workload execution context to the cloud. Additionally, using this traditional approach, the workload cannot be executed on the cloud until the entire migration is complete.

U.S. Pat. No. 9,753,669, entitled "Real Time Cloud Bursting", filed Nov. 26, 2014, issued Sep. 5, 2017, and referred to herein as the "Cloud Bursting application" presents a solution that starts the migration process on-demand by decoupling the computing processes and the storage resources that a server is using to execute a workload and transferring the computing process to the cloud. Transferring the computing processes to the cloud immediately grants benefits of having additional computing resource while making valuable data center resources available for re-allocation.

Once one or more workloads are executing in the cloud, workload data residing in the data center may still need to be migrated to the cloud. Unfortunately, migrating the workload data from the data center to the cloud normally requires stopping the computing processes that are using the workload data to prevent the workload data from being modified during the migration process. Additionally, workload data copied from the data center to the cloud may remain unused for a significant amount of time before benefits of having that workload data available on the cloud may be realized.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1.0 GENERAL OVERVIEW
2.0 CONTEXT OF IMPLEMENTATION: ENVIRONMENTAL CONSTRAINTS AND BENEFITS
3.0 EXAMPLE SYSTEM ARCHITECTURE
   3.1 BACKEND NODE
   3.3 TARGET NODE
   3.4 CLUSTERED STORAGE CACHES USING CLOUD RESOURCES
4.0 FUNCTIONAL EXAMPLE
   4.1 INITIAL CLOUD BURSTING PHASE
      4.1.1 Data Management by Backend Node
      4.1.2 Data management by Frontend Node
   4.2 PRE-MIGRATION DETERMINATIONS
      4.2.1 Determining a data access pattern
      4.2.2 Prioritizing Migration Content 4.3 BACKGROUND MIGRATION PROCESS
4.4 BANDWIDTH OPTIMIZATION AND MANAGEMENT
    4.4.1 Request Batching and Pipelining
    4.4.2 Lossless Compression
    4.4.3 Block-level Deduplication
    4.4.4 Special block detection
4.5 MIGRATION PROCESS
    4.5.1 Migrating to A Target Storage Pre-Allocated at a Size Smaller Than Required for Full Migration
    4.5.2 Migrating to a Dynamically Sized Target Storage
    4.5.3 Migrating to a Target Storage Pre-Allocated to a Size Required for Full Migration
4.6 MIGRATION FINALIZATION OR ABORTING
5.0 HARDWARE OVERVIEW
6.0 OTHER ASPECTS OF DISCLOSURE 1.0 General Overview Having the ability to migrate some workloads to one or more public "cloud" servers provides a cost-efficient solution that avoids setting up new servers or upgrading old servers. However, the migration process still typically requires up-front planning and significant downtime, especially in cases where there is a large amount of data to transfer. U.S. patent application Ser. No. 14/554,837, filed Nov. 26, 2014, titled "Real Time Cloud Bursting", and referred to herein as the "Cloud Bursting Application" presents a solution which in one embodiment starts the migration process on-demand by (1) decoupling the computing processes and the storage resources that a server is using to execute a workload and (2) transferring the workload computing processes to the cloud while maintaining the workload data at the on-premises (on-prem) data center. Transferring the workload computing processes to the cloud grants immediate benefits of having additional computing resources while making valuable data center resources available for re-allocation.

Once one or more workloads are executing in the cloud, workload data residing in the on-prem data center may still need to be migrated to the cloud. Unfortunately, migrating the workload data from the data center to the cloud could require stopping the computing processes that are using the workload data to prevent the workload data from being modified during the migration process. Additionally, workload data copied from the data center to the cloud may remain unused for a significant amount of time before benefits of having that workload data available on the cloud may be realized. The Cloud Bursting Application may not be, and is not admitted to be, prior art to the present disclosure.

Techniques are described herein to perform workload migration across a hybrid network with cloud bursting as part of the migration process. Workload migration, as used herein, refers to transferring, from a source computing device to a target computing device, at least one workload computing process as well as the workload data itself. The workload migration processes that are described herein may be implemented using one or more computer programs, processes, daemons or other software elements that are hosted at or executed by the nodes that are further described herein for FIG. 1. A hybrid network, as used herein, refers to at least two computing devices, connected through a network, that are physically located in at least two different geographic locations. Typically, a hybrid network comprises a first sub-network connected to a second sub-network through one or more edge appliances that act as a proxy (a computer within a particular sub-network that is receiving streaming data from outside the particular sub-network.) Cloud bursting, as used herein, refers to transferring the execution of a particular workload computing process from one source computing device to a target computing device without significant downtime to complete the transfer. The workload computing process accesses workload data during execution, but the workload data remains at the source computing device.

In an embodiment, migrating workload data involves pre-fetching blocks of workload data from a source computing device and caching the blocks in a target storage device in a background process. A workload running on a target node may access the migrated data through a proxy referred to as the frontend node. To complete the migration process, the primary data source of the workload data is switched from the source computing device to the target computing device.

In an embodiment, the data transferred in the migration process comprises instructions to execute a particular workload computing process and workload data associated with the particular workload computing process. In a preferred embodiment, the particular workload computing process comprises instructions to execute a virtual machine (VM), instructions to execute an operating system (OS) executing on the VM, and instructions to execute one or more software programs to executing in the OS on the VM. In an alternative embodiment, the particular computing process comprises instructions to execute an application container (AC) and instructions to execute one or more software applications in the AC.

2. Context of Implementation: Environmental Constraints and Benefits

In some embodiments, in workload migration the required time to migrate is typically proportional to the size of the data. In some approaches, such as truck-based data transfer, data migrated over Wide Area Network (WAN) is subject to bandwidth limitations and other connectivity issues. A second constraint is providing high workload performance while data is still being migrated. A third constraint is keeping the application data on a similar availability level as it was on the source storage when it is being transferred to the target storage.

In some embodiments, a migration system may be implemented in a manner that is compatible with certain constraints imposed by commercial cloud service providers. For example, cloud vendors typically provide a virtual environment without special hardware features such as an uninterruptible power supply (UPS), flash memory cache, etc. Cloud vendors typically give limited availability and reliability for running virtual machines (VMs) which can be turned off or restarted due to infrastructure updates or other operation issues. Cloud vendors typically provide some highly-available and highly-reliable cloud services, such as Object Storage, Load Balancers, etc. Cloud resources are not limited but each resource and each operation has additional computational and storage costs.

With these constraints in mind, a reliable and cost-efficient infrastructure can be implemented on top of the non-reliable virtual machine platform provided by the cloud vendor. The migration techniques describe herein perform fast, on-demand migration of the workloads (including the VMs or application containers), which can be translated into one or more of the following benefits:

Immediate benefit—Workload execution (the computing process) is moved to the target with minimal downtime and without the requirement of up-front planning.

Non-disruptive background data migration—Data is migrated in the background without affecting workload execution.

Easy Abort Procedure—Ability to revert the migration process without heavy cost.

Quick Cut-off Procedure—Ability to complete the migration process once workload data has been transferred with minimal downtime.

3. Example System Architecture

According to one embodiment, an architecture of a computing system comprises a source computing device, a backend computing device (referred to herein as a backend node), a frontend computing device (referred to herein as a frontend node), and a workload computing device (referred to herein as a target node). Realistically, in some embodiments, the system architecture does not change, but the hardware necessary to perform specific functions may vary depending on the phase of migration. The phase of the system may be in (1) an initial phase with a workload executing entirely on the source node and the target node performing booting procedures; (2) an intermediate phase with a workload computing process executing on the target node and the workload data stored by the backend node; and (3) a migration finalization phase with the workload executing entirely on the target node.

Figure 1:
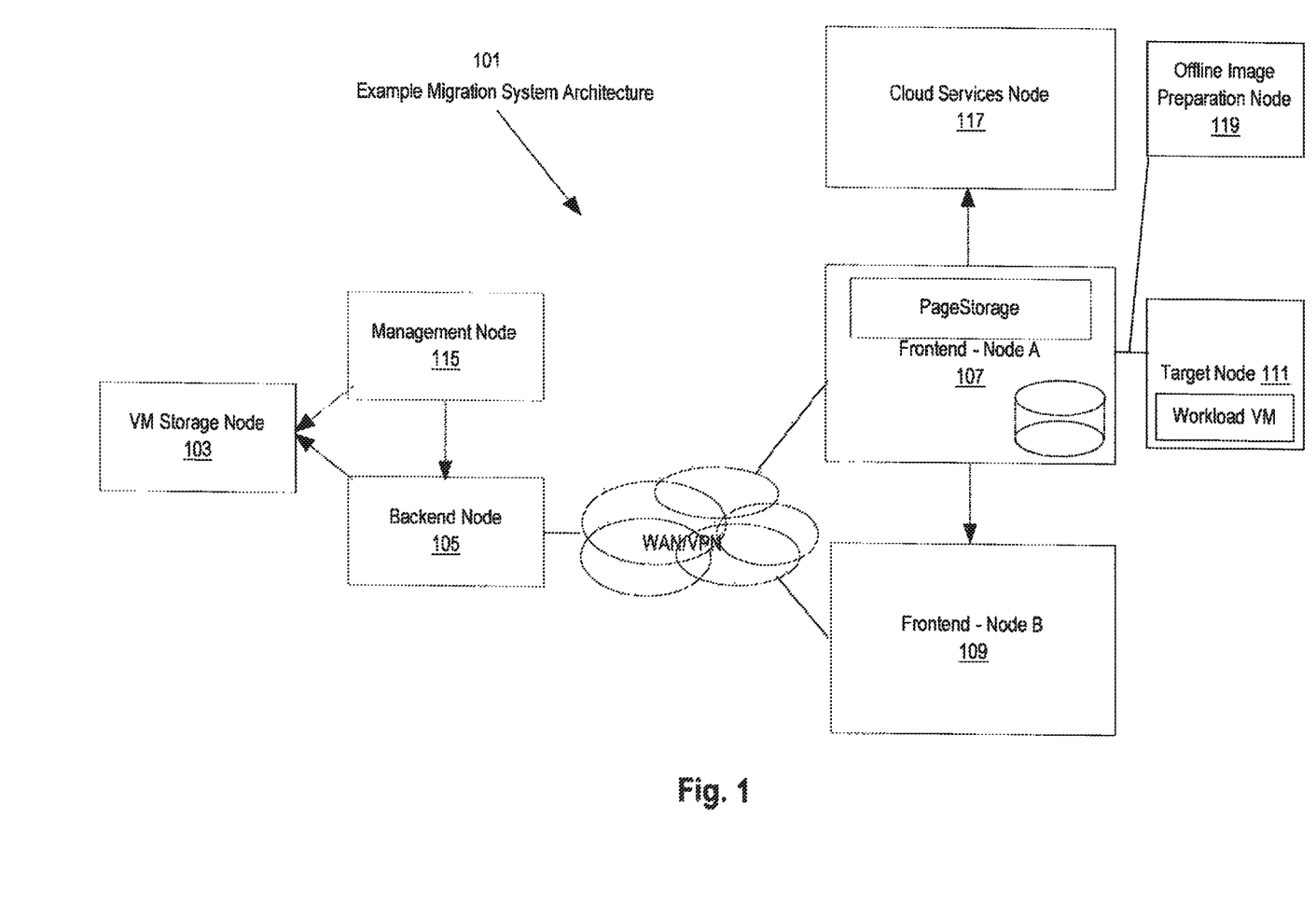
FIG. 1 is a block diagram illustrating an example migration system architecture.

FIG. 1 is a block diagram illustrating an example system architecture in an intermediate phase of migration.

In an embodiment, a computer system architecture 101 comprises a VM storage node 103, a backend node 105 coupled to the VM storage node 103, two frontend nodes 107, 109, coupled to the backend node 105 by wide area network (WAN) and/or virtual private network (VPN), and a target node 111 that is currently executing the workload VM 113 connected to at least frontend node 107. In an embodiment, the VM storage node 103 may comprise a cluster of hosts in an on-premises data center. The VM storage node 103 may execute virtual machine management software such as VMware ESX or VMware vCenter, but may be generalized for any source such as Amazon Web Services, Microsoft Azure, or OpenStack. In an embodiment, the system 101 may also support multiple backend nodes. The example system architecture also comprises a management node 115 for managing the hybrid network, a node for remotely managing cloud services 117 such as S3 buckets from AMAZON, and a node for offline image preparation 119. In an embodiment, Cloud Services Node 117 may exist outside the system 101, and the task of managing cloud services may be provided by the cloud services provider. For example, Frontend Node A 107 and Front Node B 109 may interact directly with the cloud services provider when required. Each node contains one or more processors and volatile memory with instructions, which when executed by the one or more processors, perform specialized tasks.

The workload migration processes that are described herein may be implemented using one or more computer programs, processes, daemons or other software elements that are hosted at or executed by the nodes that have been described herein for FIG. 1. Agents may be installed at each of the nodes to cooperatively execute the processes that are described. The specific location of software to execute the described functions is not critical and all processes may be implemented using control software at management node 115 that provides instructions or calls to other nodes to carry out aspects of the processes that are described.

3.1 Backend Node

In the initial phase, the backend node 105 is physically located near the source node that was originally executing the workload. In FIG. 1, the source node is not shown. The source node is not necessary in the intermediate phase unless used as a storage device for the workload data. In the intermediate phase, the backend node 105 is physically located near the VM storage node 103. In embodiments where the workload is migrating away from an on-prem data center, the backend node 105 is on-prem. In embodiments where the workload is migrating away from a particular cloud service (to another cloud service or back to on-prem), the backend node 105 is on that particular cloud service. In an embodiment, the backend node 105 is programmed or configured to:

Connect and take ownership of the source workload data

Establish a secure channel to the front end through a trusted domain and encryption (e.g. VPN/secure sockets layer (SSL) or transport layer security (TLS)+dual-side certificate verification)

Optimize data transfer within the channel to the frontend node through data deduplication and compression

3.2 Frontend Nodes

In the initial phase, the frontend nodes 107, 109 are physically located near the bootstrapping node. The bootstrapping node is not shown in FIG. 1 because it becomes the target node in the intermediate phase. In the intermediate phase, the frontend nodes 107, 109 are physically located near the target node 111. In embodiments where the workload is migrating to a cloud computing device, the frontend nodes 107, 109 are in the cloud. In embodiments where the workload is migrating back to on-prem, the frontend nodes 107, 109 are in that particular on-prem data center. In an embodiment, the frontend nodes 107, 109 are programmed or configured to:

Provide accelerated storage access to transferred workload computing processes

Maintain or use storage at the same location for data storage and caching

Frontend node 107 is configured as the primary data source between the target node 111 and the backend node 105. Frontend node 109 is configured as the secondary data source between the target node 111 and the backend node 105 through data replication.

3.3 Target Node

In the initial phase, the target node 111 is the bootstrapping node. The bootstrapping node serves as a launch pad for workload VM execution. In the intermediate phase, the target node 111 is physically located near the frontend nodes 107, 109. In embodiments where the workload is migrating to a cloud computing device, the target node(s) 111 are in the cloud. In embodiments where the workload is migrating back to on-prem, the target node(s) 111 are in that particular on-prem data center. In an embodiment, the target node/bootstrapping node 111 is programmed or configured to:

Provide disk abstraction to the guest operating system (OS) in the initial phase Carry over the guest OS computing processes in the initial phase Execute workload computing processes in the intermediate phase Execute the workload in the final phase In some embodiments, two or more nodes may be combined into a single computing device. For example, the source node and the backend node 105 may be a single computing device. As another example, frontend node 107 and the target node 111 may be the same computing device.

3.4 Clustered Storage Caches Using Cloud Resources

Figure 6:
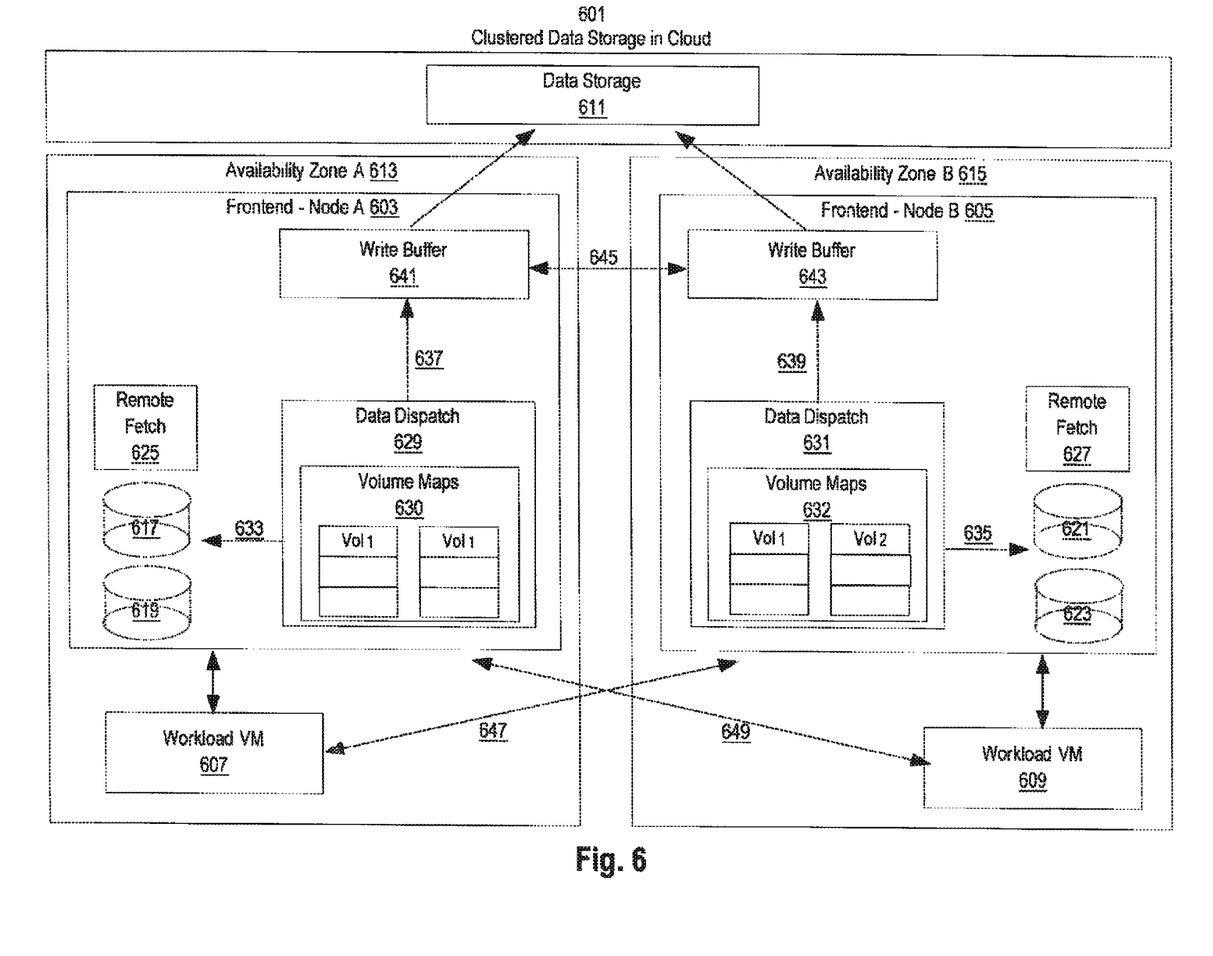
FIG. 6 is a block diagram illustrating clustered storage caches using cloud resources.

Clustered storage involves using two or more frontend nodes together to increase performance, capacity, or reliability. FIG. 6 is a block diagram illustrating clustered storage caches using cloud resources 601. Each workload computing process has a high-performance and disposable cache 617, 619, 621, 623, which contains mostly used data blocks and provides low latency and high throughput for workload data. The data that is generated by the workload computing process is synchronously replicated to the memory of at least two frontend nodes located in different availability zones 613, 615, which keeps latency low and reliability high. For example, frontend node A 603 and node B 605 may each provide clustered storage caches for a connected workload VM.

Frontend Node A 603 and Frontend Node B 605 provide access to all files to any workload VM 607, 609 connected to them regardless of the physical location of the file. In an embodiment, the workload computing processes rely on availability infrastructure of public cloud vendor such as AMAZON WEB SERVICES (AWS) Availability Zones and MICROSOFT AZURE Availability Sets. Periodically (typically 30 sec), the data is stored into highly-available and high-reliable cloud object storage 611. Each frontend node 603, 605 includes a remote fetch 625, 627 for retrieving data blocks from another VM. The data dispatch 629, 631 from each frontend node 603, 605 works by reading 633, 635 data blocks from caches 617, 619, 621, 623. Each data dispatch 629, 631 includes volume maps 630, 632 to track the state of the data blocks. Data dispatch 629, 631 writes to the write buffer 641, 643 which may be journaled. Each write buffer 641, 643 for the respective node synchronously replicates 645 data between each node. Each Workload VM 607, 609 has access to at least one failover path 647, 649 which connects the respective workload to a different node in the event of a node failure.

Thus, the workload computing processes run as a farm of virtual machines or containers that can sustain partial failure.

4. Functional Example

4.1 Initial Cloud Bursting Phase

The initial transition phase may be based on technology described in the Cloud Bursting Application. First, the backend node takes ownership of the workload data. This can be done by either mounting relevant virtual disks, or connecting to the corresponding virtual storage as described herein. Then, a remote data channel is established between the migration source (e.g., on-premises data center) and migration target (e.g., cloud). Finally, a bootstrapping node boots using the data provided by the frontend node, which streams the data on-demand from the backend node. At the same time, the frontend node starts to pre-fetch the workload data in the background. Even after the initial cloud bursting phase is completed, the migration background process continues in the intermediate phase.

4.1.1 Data Management by Backend Node

The backend node takes ownership of the workload data. If the backend node is on-premises, the backend node takes responsibility of the VM disks by either mounting the disk to the backend node or connecting to the disk data using available interfaces such as internet small computer systems interface (iSCSI), VMWARE virtual disk development kit (VDDK), or network file storage (NFS). If the backend node is located in the cloud, the backend node mounts VM disks (e.g. AMAZON elastic block store (EBS) volumes or virtual hard disks (VHDs)). For container based workloads, container-based workloads rely on locally-attached storage to store system state. The storage abstraction is provided by container host using the storage driver. For those workloads, the backend node uses the same storage driver to mount and take ownership of the data. The disks are mounted for the purposes of providing remote read access to the data as required by the workloads (on-demand reads and background reads), and writing back the changes done by remote workloads.

Figure 2:
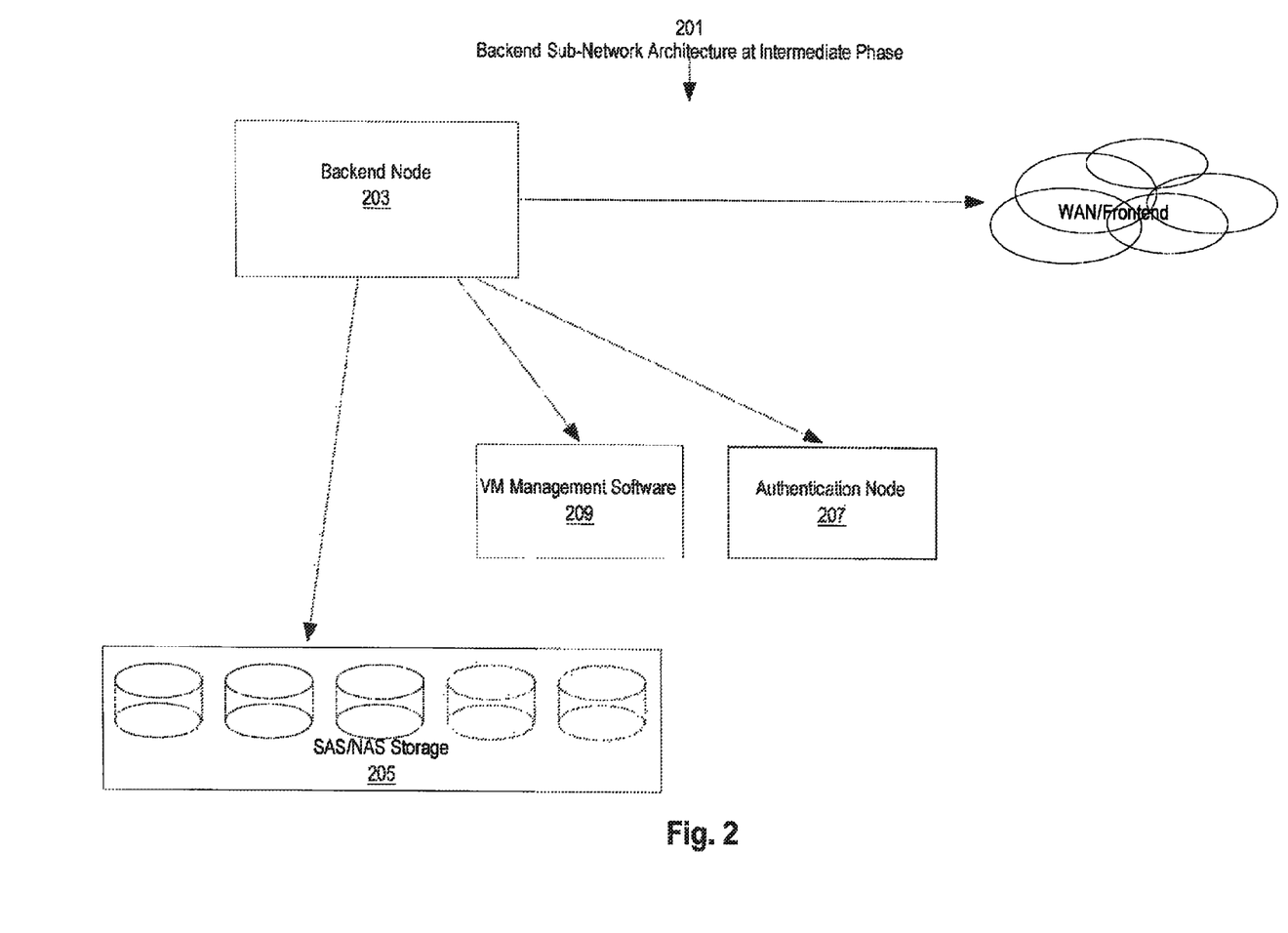
FIG. 2 is a block diagram illustrating an example system architecture of the backend sub-network at the intermediate phase.

FIG. 2 is a block diagram illustrating a detailed example system architecture of the backend sub-network at an intermediate phase. In the intermediate phase 201, backend node is connected to storage attached network (SAN)/network attached storage (NAS) storage 205. The backend node is also connected to a node executing authentication 207 and virtual machine management software 209 such as VMware ESX and VMware vCenter. The backend node is also connected to the frontend sub-network through WAN.

4.1.2 Data Management by Frontend Node

Data management by the frontend node involves the frontend node requesting data that is immediately necessary for the process acquired by the target server computer to function. Alternatively, data that is necessary and unique may be provided to the frontend node. These "on-demand" requests may initially be serviced by the backend node, which accesses the source storage of the backend node to service the requests. The on-demand requests may also be serviced by the frontend node, which has a cache to access data that has been previously accessed more quickly.

4.2 Pre-Migration Determinations

Migration through a background process typically involves the backend node prioritizing migration content and the frontend node storing said content based on the resources allocated for said migration.

4.2.1 Determining a Data Access Pattern

The data which is or will be required by the workload is migrated based on data access patterns. The backend node determines first whether data access patterns of a particular VM's source storage to be migrated are available. If the data access patterns of the particular VM's storage are available, then those data access patterns are used to prioritize migration content. Optionally, a migration management client may provide a control for the network administrator to temporarily track data access patterns prior to transferring the particular application (i.e., while the particular VM is still running on the migration source).

Data access patterns are made available by installing recording software on source nodes or target nodes that record IO requests performed by a VM running on the node. The recording software saves records of the requests in a portable database file. The backend node or frontend node then analyze the file to predict the next IO request from a particular VM and pre-fetch the required data. For example, recording software records a VM boot sequence, and saves the reads to offsets 100, 200, 300, and 400. The next time that VM system needs to boot, the VM will perform the same sequence. When the backend node detects the sequence 100, 200, the backend node pre-fetches the next two offsets 300, 400 and sends them to the frontend node, before the frontend node needs to request those offsets on-demand.

However, if the data access patterns of the particular VM are unavailable and unattainable, then the backend node scans other VMs in the network for VMs similar to the particular VM (e.g., same OS with same disk size). If access patterns of these similar VMs are available, then they are used to prioritize migration content. Alternatively, the data access patterns of a similar VM may be tracked during the migration of the particular VM in order to prioritize migration content.

4.2.2 Prioritizing Migration Content

Based on the determined data access pattern, a background process pre-fetches prioritized data which has not already been fetched as on demand data. Data is prioritized using the following techniques:

If a data access pattern was obtained of an active workload before the start of the migration phase, the backend node prioritizes disk blocks accessed by the workload based on their access frequency while workload was still on-premises. Migration content from those areas is pre-fetched first by the backend node in the background process.

Based on the data access pattern that was determined, the backend node gives higher priority to blocks that correspond to files that are frequently accessed by active workloads. Searching for data blocks that correspond to these files may be hardcoded into the background process, such as searching for: Boot disk areas for VMs, meta-data areas of the file system (e.g. new technology file system (NTFS) master file table (MFT)), and popular OS areas (e.g. C:\Windows\Program Files or /lib). Migration content from these areas is pre-fetched second by the backend node in the background process.

Based on on-demand block requests from the frontend node, the backend node gives higher priority to other blocks of a file that corresponds to an on-demand block that was previously accessed. For example, when reading the file meta-data from NTFS MFT is detected, followed by reading the first block of the file, the system starts pre-fetching the other blocks of this file with higher priority. Early on-demand read requests typically are given priority over later on-demand read requests. Migration content from these areas is pre-fetched third by the backend node in the background process.

Based on workload OS and file system, the migration process filters out disk areas that are duplicated and/or unused by file system (based on NTFS MFT or EXT meta-data). If unprovisioned areas of the disk are detected, they are not fetched at all. This is achieved by using corresponding query interface (if available), such as VMDK/VHD meta-data or container file system structure.

4.3 Background Migration Process

The migration process involves the backend node pre-fetching data and serving it to the frontend node through a background process. The background process is labeled as such because computing resources (e.g., bandwidth, processing cycles, and memory) are dynamically allotted to the background process based on their availability from other higher priority processes. Both the particular application acquired by the target server computer and the on-demand data fetching process have priority when compared to the background migration process.

The background migration process populates the target storage with remote blocks while the workloads are running at the frontend subnetwork. While the frontend node fetches on-demand data, the background process runs at a low priority; on-demand fetches should not be affected by the background task. If data is fetched on-demand, the system migrates and stores the fetched data despite not going through the background pre-fetch process.

The background process starts with the frontend node iterating over blocks in a block map, based on pre-fetch priority of the migrated content as described in pre-migrating determinations as described herein. The block map describes all necessary data to detect if a block is migrated or not; provide necessary data for block lookup; and provide block meta-data for block decryption (if applicable) and verification.

The blocks may have already been transferred when fetching or pre-fetching blocks for another VM. If the blocks have already been migrated, the frontend node updates a volume map. A separate volume map is maintained for each of the workload computing processes (e.g., VMs) that are transferred across the hybrid network. The volume map tracks data and files for individual VMs.

If a block in the queue has not already been migrated, the frontend node pre-fetches these blocks from the backend node, saves them to the migration target storage, and updates the block map and the volume map.

The block map is shared across multiple migrated computing processes. Blocks are checked either by signature or by block index. If the data is available by block index, despite being updated and not matching the remote data, the overwritten data should never be accessed from this entry, thus keeping consistency.

Figure 5:
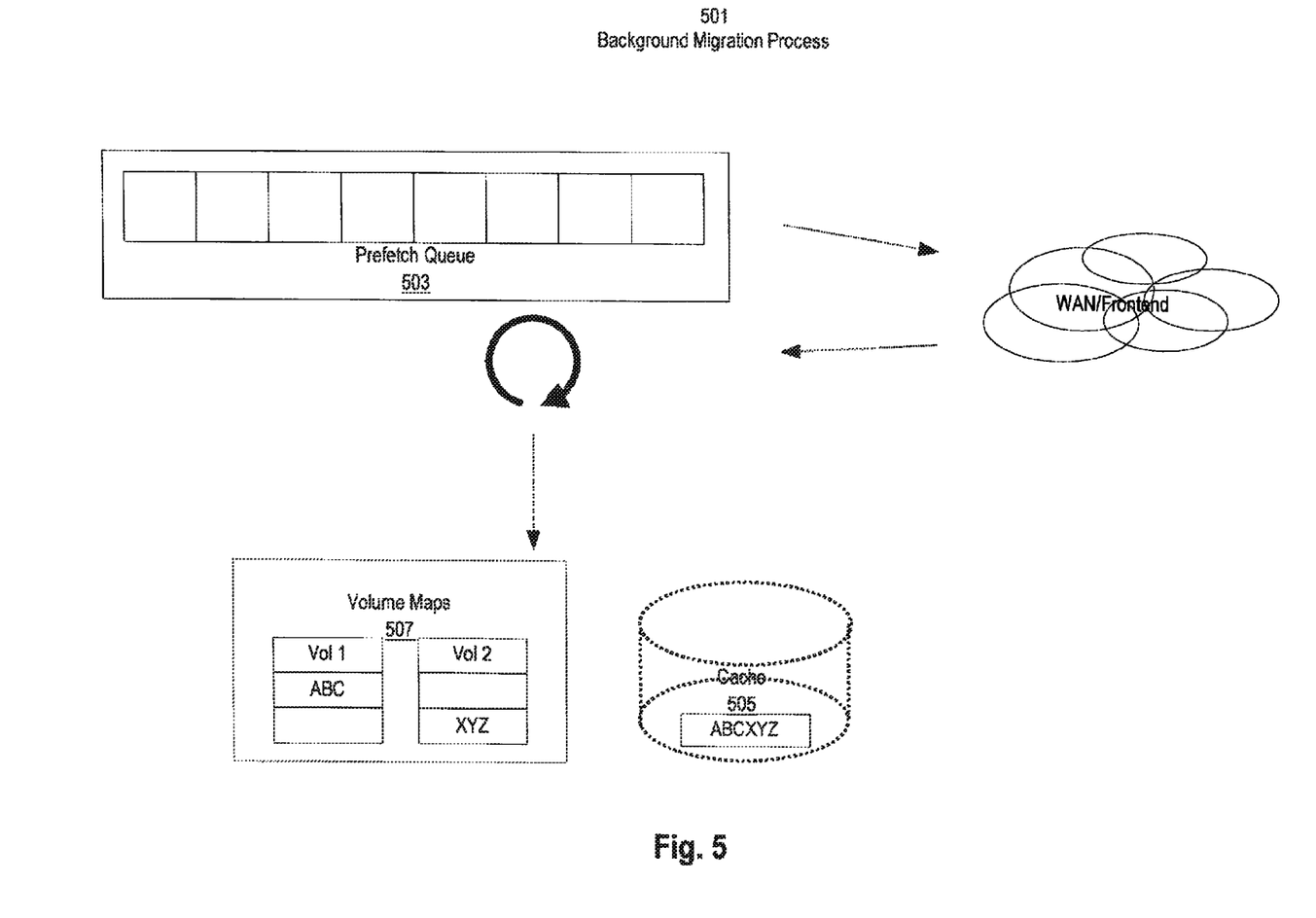
FIG. 5 is a block diagram illustrating the background migration process.

FIG. 5 is a block diagram illustrating the background migration process. The pre-fetch queue 503, maintained in the backend node, orders data blocks based on data access patterns as described in pre-migration determinations. Data is sent through WAN to the frontend node. The block map and data is stored in the cache 505 labeled "ABCXYZ". A block may have been transferred for another VM but applies to the VM that is currently being migrated. In this case, the volume map 507 is updated without necessarily needing to update the block map. In FIG. 5, two individual computing processes have been transferred over referred to as Vol 1 and Vol 2 inside volume maps 507. Portions of those computing processes ABC of Vol 1 and XYZ of Vol 2 have been transferred over, and marked as such in their respective volume maps.

4.4 Bandwidth Optimization and Management

The backend and frontend nodes utilize the migration medium (e.g. WAN) as efficiently as possible. To reduce WAN transfer time and utilize the available resources, the migration process employs the following optimization techniques:

4.4.1 Request Batching and Pipelining

Instead of fetching a single block and placing a single block in the migration target storage, the fetcher creates batch request with the corresponding buffer for multiple blocks and start fetching data for all of these (either from remote or cache). This helps to eliminate latency impact of the source storage access. In addition, the process pipelines number of independent fetch request, which eliminates dependency on WAN latency.

4.4.2 Lossless Compression

All traffic between source and target is compressed using lossless compression algorithms (for example, the LZ algorithm). Additionally, all migrated content is stored in compressed form. Once migration is finalized with (e.g. option #2 above), the data is decompressed for replication.

4.4.3 Block-Level Deduplication

For each block, the system calculates a SHA signature, which is then used to index the migrated data. When remote fetcher reads data with the same signature from the source storage, only the signature is transferred over the WAN and not the data itself, while receiving side uses already migrated data as a source. The system allows using fixed-size blocks or variable-length blocks.

4.4.4 Special Block Detection

The migration process includes special handling for unallocated and zeroed disk areas—those blocks are not transferred over the WAN and not stored on the target storage. Apart from reducing the amount of data that is transferred, the migration process maintains priority mechanisms to allow on-demand request requests to get more bandwidth allocation than migration requests.

There two supported modes for traffic prioritization: quality of service (QoS)-ready WAN and QoS-less WAN. With QoS-ready WAN, when the system is deployed in network environments that support QoS rules by port (or differentiated services control point (DSCP) marking), the migration process creates a separate transmission control protocol (TCP) connection for background fetching operations. This allows to keep low latencies for on demand requests even in case of big TCP send buffers being filled with background data.

With QoS-less WAN, to allow on demand requests get priority over background fetch requests, the migration process throttles the outgoing requests from the backend to the frontend, the process limits amount of outstanding fetcher requests issued by the frontend; the process limits amount of executed requests processed by the backend; the process re-ordering outgoing WAN queues to give priority for on-demand fetch requests. Additionally, to prevent starvation of background fetch requests, there is an additional threshold for minimal amount of those requests that can always run.

4.5 Migration Process

The migration process may involve one or more processes to pre-fetch data. The migration process is often based on the target storage resources pre-allocated for a particular workload. Target storage can be pre-allocated as (1) a small cache for storing pre-fetched data, (2) a dynamically sized storage device, where storage space is added as more content is migrated over, (3) or a pre-sized storage device that has storage space pre-allocated for a particular workload.

4.5.1 Migrating to a Target Storage Pre-Allocated at a Size Smaller than Required for Full Migration A first approach comprises migrating to target storage that is pre-allocated at a size smaller than required for full migration of data. In this approach, the on-prem sub-system remains the primary workload data source both during and after migration, but some data is "cached" in the target storage device. The layout of the stored data is adapted to the migration target (i.e. different data storage format for on-premises and cloud).

The benefits of this approach are:
immediate benefit from cloud resources without long downtime (e.g. instance starts to run on target in a matter of minutes)
unified data management
optimized tiered data storage at reduced costs, and more efficient migration to the next target When workload migration is started, the system only transfers minimal required amount of data for the workload to start and then the remaining content is migrated either as a cache for on-demand data or as cache with pre-fetched content using the background process.

Figure 7:
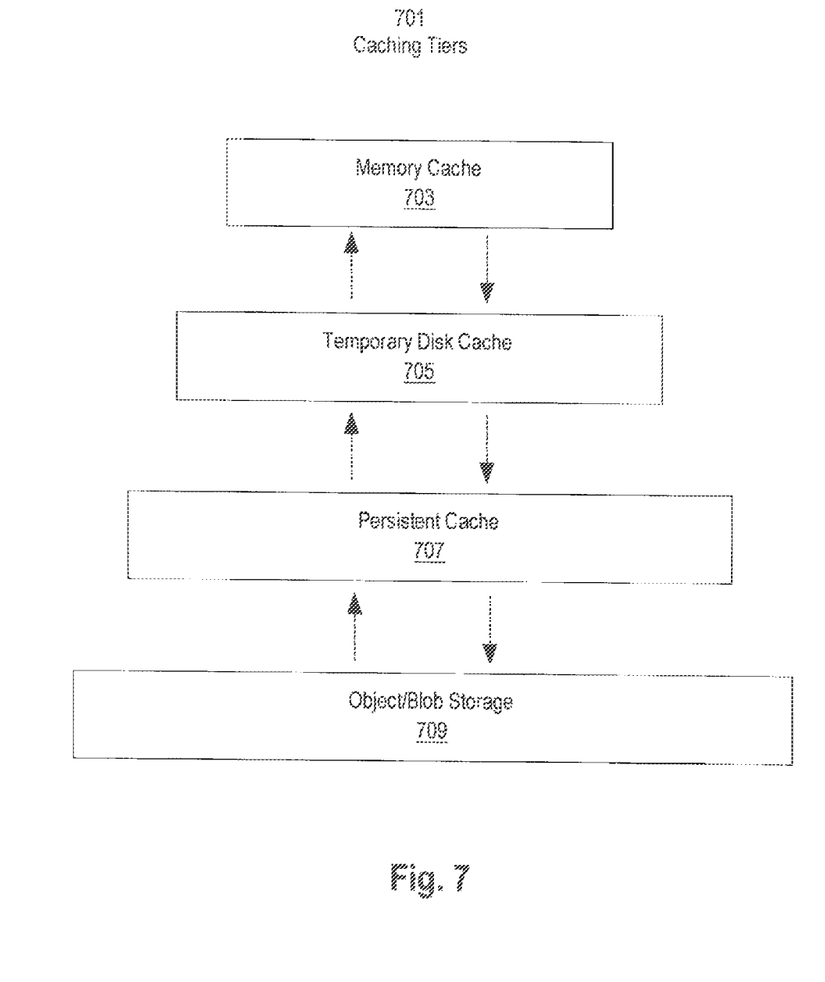
FIG. 7 is a block diagram illustrating multiple caching tiers.

In order to provide good performance while accessing the data, the migration system contains multiple caching tiers, each provides different latency and throughput and serves different purposes. For example, FIG. 7 is a block diagram illustrating multiple caching tiers 701. Memory cache layer 703 provides the fastest response time and very high throughput for most-accessed data, but it has a size limit due to its cost. Disk-based storage 705 provides good balance between performance and size and allow to accommodate relatively large dataset for the migrated workloads. Persistent cache 707 provides a slower response time than the temporary disk cache 705, but has increased size to accommodate larger workloads. Cloud-based Object Storage 709 comes with relatively high latency for data access, but, at the same time, it typically has very low cost per GB which allows storing major portion of rarely accessed workload data in highly-reliable and cost-effective storage.

4.5.2 Migrating to a Dynamically Sized Target Storage

Another approach may comprise migrating to target storage having a dynamically changing size. In this approach, the on-prem sub-system remains the primary workload data source until data migration is completed. Once all data is available, the system starts converging iterative replication process as follows:

```
CHANGESET=[full content]
while CHANGESET>THRESHOLD do
    SNAPSHOT=current state
    copy CHANGESET to the target storage
    CHANGESET=[written data since SNAPSHOT]
end
pause/stop workload
switch to the target storage
resume workload
```

That is, the system iteratively copies all migrated data to the target storage, till the CHANGESET is small enough to make the switch.

The benefits of this approach is an ability to perform large amount of migration tasks with modest migration infrastructure in terms of storage and compute power as only small amount of VMs/volumes are migrated at once (basically, enough to effectively utilize the transfer medium). Another benefit is that the copy process (iterative replication) can be performed completely separately from the process that handles workload IO, until the actual switch should be made.

Figure 4:
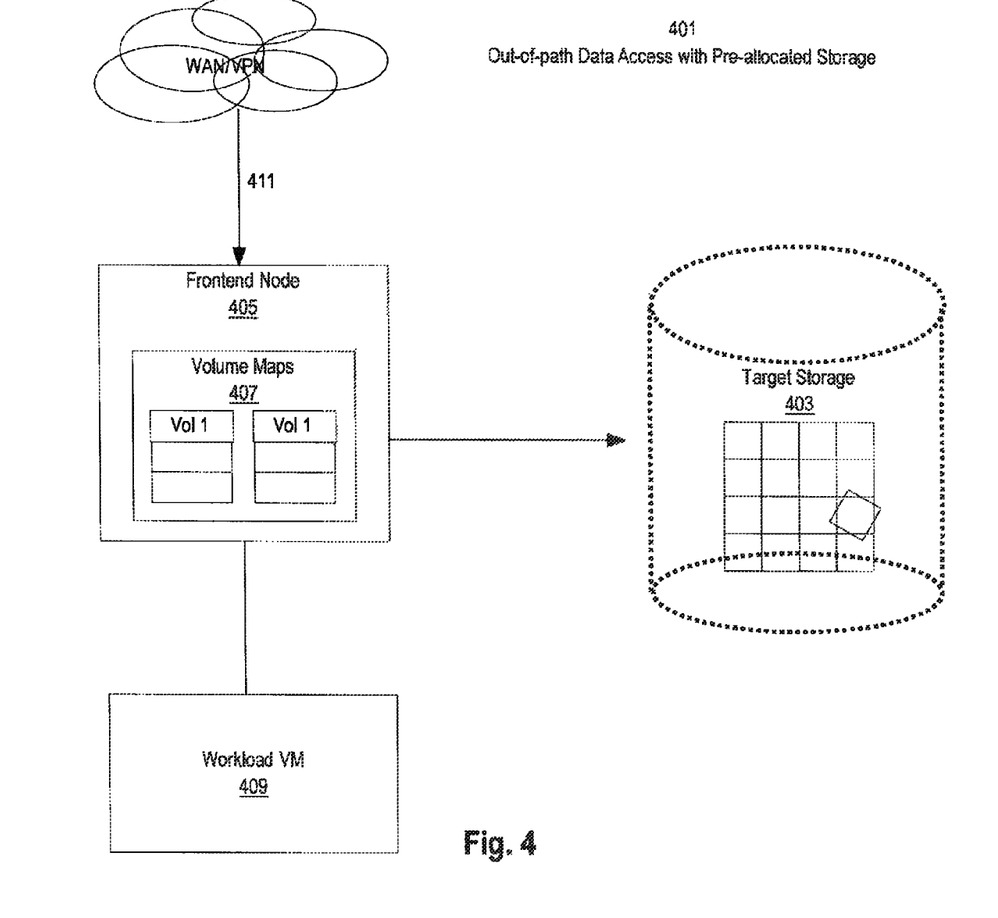
FIG. 4 is a block diagram illustrating out-of-path data access with pre-allocated storage.

4.5.3 Migrating to a Target Storage Pre-Allocated to a Size Required for Full Migration Yet another approach comprises migrating to target storage that is pre-allocated to a size that is required for full migration. In an embodiment, this option is adapted to the scenarios where storage allocation is not very dynamic or it's already available. FIG. 4 shows in-of-path data access with pre-allocated storage 401. As shown in FIG. 4, the frontend node 405 fetches data 411 from the backend via WAN/VPN using on-demand reads and background reads. The frontend node includes volume maps 407 that track the state of the data blocks. Additionally, the frontend node 405 is connected to the workload VM 409. The frontend node uses pre-allocated storage 403 to store migrated content while maintaining a map that tracks untouched data blocks, migrated data blocks (marked as shaded blocks in FIG. 4) and modified data blocks (marked as black in FIG. 4).

This approach requires minimal additional storage resources for the migration process itself and mostly suits cloud-to-on-premises migration scenarios.

4.6 Migration Finalization or Aborting

The migration process includes at least two phases: (1) a migration phase and (2) a finalization phase (i.e., switch/cut-off).

Figure 3:
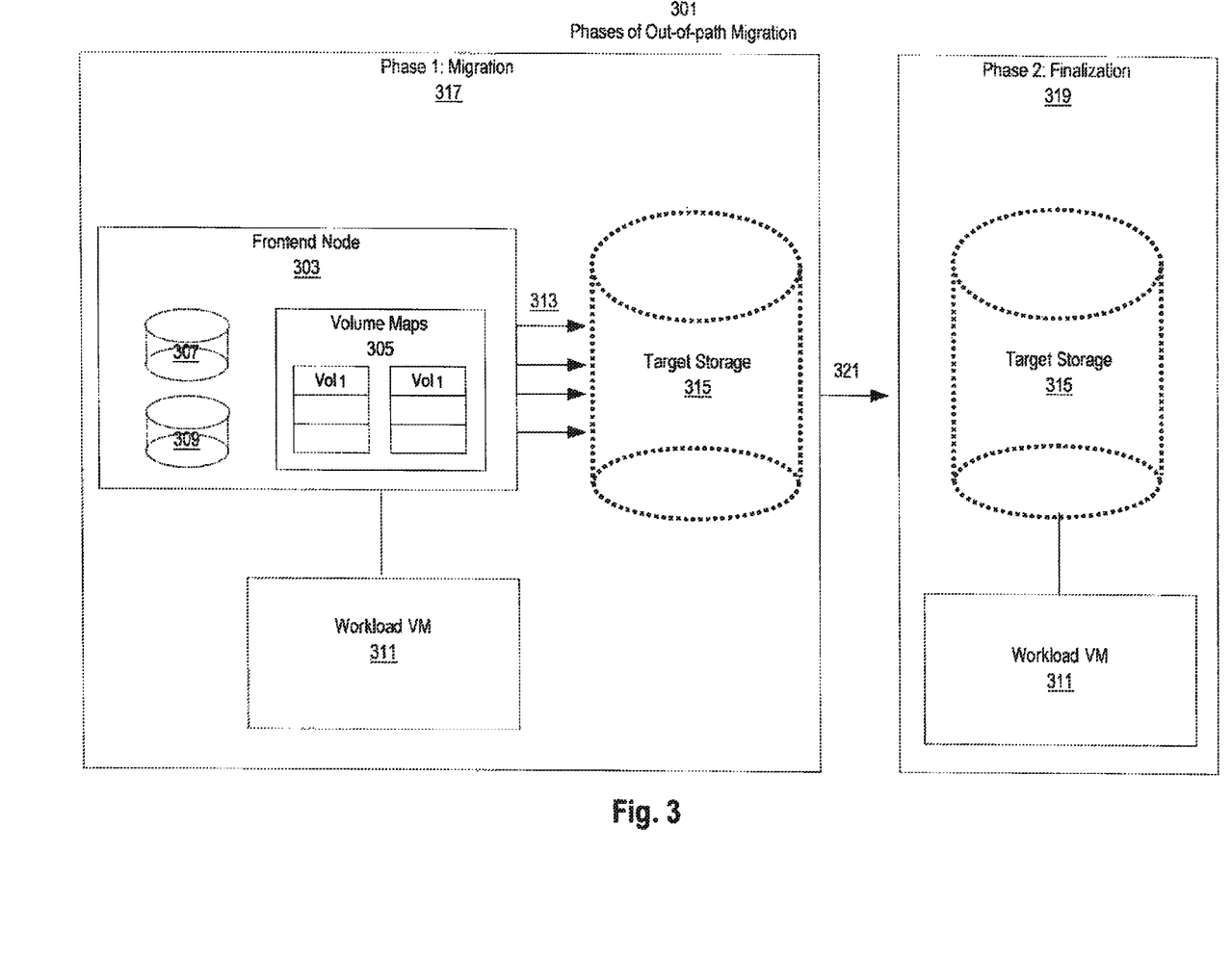
FIG. 3 is a block diagram illustrating various phases of out-of-path migration.

FIG. 3 is a block diagram illustrating various phases of out-of-path migration. The migration phase 317 includes a workload VM 311 coupled to a frontend node 303 which comprises volume maps 305, cache 307, and migration storage 309. During the migration phase 317, the system iteratively copies 313 all migrated data to the target storage 315 such as cloud storage or SAS/NAN, until the changeset is small enough to make the switch.

During the migration phase 317, the system provides read access to the workload VM 311 running on the target, but also writes back any changes that workloads performed during this time. At any point during this process, the user can decide to pause or even abort the migration process, which returns the workload back to the source with fully updated state of its data.

During the finalization phase 319, all migration content resides on the target storage 315 and the workload is switched 321 to executing against data stored on the target storage 315 as the primary copy. At this stage, all the corresponding storage resources on source node can be disposed.

Once data is transferred to the target location, the target node takes ownership of the target storage and the proxy (e.g. frontend node) is removed from the data path of the workload. The workload switches to native execution on the target node.

Thus, during the migration phase 317, the target node has the ability to run a workload in the cloud before all data is transferred, but once workload data migration is complete, the workload quickly switches to native execution. The entire workload is now running on the target node, the same way as if it was created there (or fully imported) without need for the frontend node to be in the data path.

By using the techniques described herein, namely the on-demand retrieval of data while simultaneously migrating data in background process through a hybrid network, several benefits can be achieved. An immediate benefit is that workload execution is moved to the target with minimal downtime and without requirement for up-front planning. Additionally, the data migrated in the background is non-disruptive and does not impact workload execution. Furthermore, being able revert the migration process without heavy cost and the ability to complete the migration process once ready with minimal downtime are substantial improvements.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
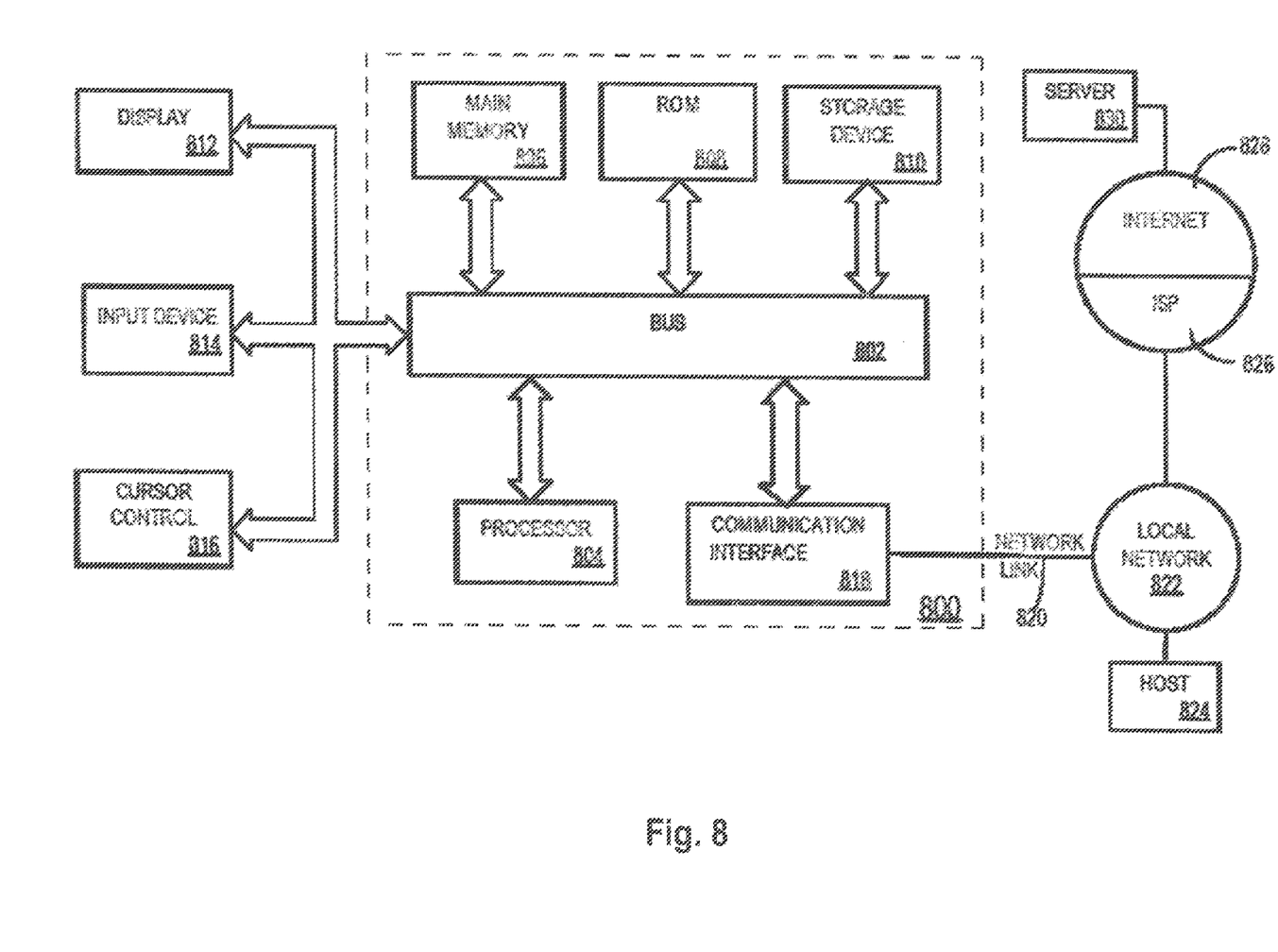
FIG. 8 is a block diagram illustrating a computer system that may be used to implement the techniques described herein.

For example, FIG. 8 is a block diagram that illustrates a computer system 800 upon which an embodiment of the invention may be implemented.

Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read-only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Other Aspects of Disclosure

The disclosure also encompasses the subject matter of the following numbered clauses, which are not intended as formal claims but instead recite features of the subject matter in prose form:

31. The system of clause 27, wherein receiving the one or more data blocks that are necessary to run the first computing instance on the workload computing device is prioritized over receiving the one or more data blocks in the first background operation.

32. The system of clause 27, wherein only necessary and unique data blocks are received by the workload computing device; wherein duplicate and unused data blocks are not received by the workload computing device and not stored in the target data repository.

33. The system of clause 27, wherein receiving the one or more data blocks from the source data repository in the first background operation comprises pre-fetching one or more data blocks from the source data repository and serving the one or more data blocks to the workload computing device through a background operation.

34. The system of clause 27, further comprising instructions which when executed by the workload computing device cause pre-allocating the target data repository using a size that is smaller than would be required for a full data transfer.

35. The system of clause 27, wherein the target data repository is dynamic.

36. The system of clause 27, further comprising instructions which when executed by the workload computing device cause pre-allocating the target data repository using a size that is required for a full data transfer.

37. The system of clause 27, further comprising instructions which when executed by the workload computing device cause: streaming, to one or more frontend computing nodes that are associated with the source data storage, from one or more backend computing nodes that are associated with the workload computing device and the target data storage, such one or more data blocks as necessary for the first computing instance running on the workload computing device to function; transferring, to the one or more frontend computing nodes from the one or more backend computing nodes, the remaining one or more data blocks using a second background operation and storing the remaining one or more data blocks in the target data storage.

38. The system of clause 37, further comprising instructions which when executed by the workload computing device cause transferring one or more data blocks in the second background operation by pre-fetching the one or more data blocks from the source data repository and serving the one or more data blocks to the one or more frontend computing nodes through the second background operation.

39. The system of clause 37, further comprising instructions which when executed by the workload computing device cause replicating, the one or more data blocks that are transferred from the one or more backend computing nodes to a first frontend computing node among the one or more frontend computing nodes, to the other frontend computing nodes among the one or more frontend computing nodes.

What is claimed is:

1. A data processing method comprising:
    starting, at a workload computing device, a workload computing process associated with a target data storage, the workload computing process having a primary source of data at a source data storage;
    receiving, at the workload computing device, one or more data blocks of a plurality of data blocks from the source data storage necessary to run the workload computing process on the workload computing device;
    receiving, at the workload computing device, one or more data blocks of the plurality of data blocks from the source data storage in a first background operation while the workload computing process runs on the workload computing device;
    storing, at the target data storage, the one or more data blocks received in the first background operation;
    determining that the one or more data blocks contained in the source data storage have been transferred from the source data storage to the target data storage;
    in response to determining that the one or more data blocks contained in the source data storage have been transferred from the source data storage to the target data storage, switching the primary source of data of the workload computing process from the source data storage to the target data storage;
    wherein the method is performed by one or more computing devices in communication with the workload computing device, the source data storage and the target data storage.

2. The method of claim 1, wherein the workload computing process comprises any of one or more virtual machines or an application container.

3. The method of claim 1, further comprising determining a data access pattern of the workload computing process, calculating a plurality of priority values for one or more different data blocks of the source data storage based on the data access pattern, and transferring the one or more different data blocks using the first background operation according to the priority values that have been calculated based on the data access pattern.

4. The method of claim 1, further comprising determining a data access pattern of the workload computing process, and based on the data access pattern, prioritizing transfers of one or more data blocks that correspond to particular files that are frequently accessed by the workload computing process.

5. The method of claim 1, wherein receiving the one or more data blocks that are necessary to run the workload computing process on the workload computing device is prioritized over receiving the one or more data blocks in the first background operation.

6. The method of claim 1, wherein only necessary and unique data blocks are received by the workload computing device;
    wherein duplicate and unused data blocks are not received by the workload computing device and not stored in the target data storage.

7. The method of claim 1, wherein receiving the one or more data blocks from the source data storage in the first background operation comprises pre-fetching one or more data blocks from the source data storage and serving the one or more data blocks to the workload computing device through a background operation.

8. The method of claim 1, further comprising pre-allocating the target data storage using a size that is smaller than would be required for a full data transfer.

9. The method of claim 1, wherein the target data storage is dynamic.

10. The method of claim 1, further comprising pre-allocating the target data storage using a size that is required for a full data transfer.

11. The method of claim 1, further comprising:
    streaming, to one or more frontend computing nodes that are associated with the source data storage, from one or more backend computing nodes that are associated with the workload computing device and the target data storage, such one or more data blocks as necessary for the workload computing process running on the workload computing device to function;
    transferring, to the one or more frontend computing nodes from the one or more backend computing nodes, the remaining one or more data blocks using a second background operation and storing the remaining one or more data blocks in the target data storage.

12. The method of claim 11, further comprising transferring one or more data blocks in the second background operation by pre-fetching the one or more data blocks from the source data storage and serving the one or more data blocks to the one or more frontend computing nodes through the second background operation.

13. The method of claim 11, further comprising replicating, the one or more data blocks that are transferred from the one or more backend computing nodes to a first frontend computing node among the one or more frontend computing nodes, to the other frontend computing nodes among the one or more frontend computing nodes.

14. A non-transitory computer-readable medium comprising one or more sequences of instructions which when executed using one or more processors cause the one or more processors to perform:
    starting, at a workload computing device, a workload computing process associated with a target data storage, the workload computing process having a primary source of data at a source data storage;
    receiving, at the workload computing device, one or more data blocks of a plurality of data blocks from the source data storage necessary to run the workload computing process on the workload computing device;
    receiving, at the workload computing device, one or more data blocks of the plurality of data blocks from the source data storage in a first background operation while the workload computing process runs on the workload computing device;
    storing, at the target data storage, the one or more data blocks received in the first background operation;
    determining that the one or more data blocks contained in the source data storage have been transferred from the source data storage to the target data storage;
    in response to determining that the one or more data blocks contained in the source data storage have been transferred from the source data storage to the target data storage, switching the primary source of data of the workload computing process from the source data storage to the target data storage.

15. The non-transitory computer-readable medium of claim 14, wherein the workload computing process comprises any of one or more virtual machines or an application container.

16. The non-transitory computer-readable medium of claim 14, further comprising instructions which when executed cause performing: determining a data access pattern of the workload computing process, calculating a plurality of priority values for one or more different data blocks of the source data storage based on the data access pattern, and transferring the one or more different data blocks using the first background operation according to the priority values that have been calculated based on the data access pattern.

17. The non-transitory computer-readable medium of claim 14, further comprising instructions which when executed cause performing: determining a data access pattern of the workload computing process, and based on the data access pattern, prioritizing transfers of one or more data blocks that correspond to particular files that are frequently accessed by the workload computing process.

18. The non-transitory computer-readable medium of claim 14, wherein receiving the one or more data blocks that are necessary to run the workload computing process on the workload computing device is prioritized over receiving the one or more data blocks in the first background operation.

19. The non-transitory computer-readable medium of claim 14, wherein only necessary and unique data blocks are received by the workload computing device;
wherein duplicate and unused data blocks are not received by the workload computing device and not stored in the target data storage.

20. The non-transitory computer-readable medium of claim 14, wherein receiving the one or more data blocks from the source data storage in the first background operation comprises pre-fetching one or more data blocks from the source data storage and serving the one or more data blocks to the workload computing device through a background operation.

21. The non-transitory computer-readable medium of claim 14, further comprising instructions which when executed cause performing: pre-allocating the target data storage using a size that is smaller than would be required for a full data transfer.

22. The non-transitory computer-readable medium of claim 14, wherein the target data storage is dynamic.

23. The non-transitory computer-readable medium of claim 14, further comprising instructions which when executed cause performing: pre-allocating the target data storage using a size that is required for a full data transfer.

24. The non-transitory computer-readable medium of claim 14, further comprising instructions which when executed cause performing:
streaming, to one or more frontend computing nodes that are associated with the source data storage, from one or more backend computing nodes that are associated with the workload computing device and the target data storage, such one or more data blocks as necessary for the workload computing process running on the workload computing device to function;
transferring, to the one or more frontend computing nodes from the one or more backend computing nodes, the remaining one or more data blocks using a second background operation and storing the remaining one or more data blocks in the target data storage.

25. The non-transitory computer-readable medium of claim 24, further comprising instructions which when executed cause performing: transferring one or more data blocks in the second background operation by pre-fetching the one or more data blocks from the source data storage and serving the one or more data blocks to the one or more frontend computing nodes through the second background operation.

26. The non-transitory computer-readable medium of claim 24, further comprising instructions which when executed cause performing: replicating, the one or more data blocks that are transferred from the one or more backend computing nodes to a first frontend computing node among the one or more frontend computing nodes, to the other frontend computing nodes among the one or more frontend computing nodes.

27. A data processing system, comprising:
a source data repository;
a target data repository;
a workload computing device;
a workload computing process running on the workload computing device having a primary source of data at the source data repository;
a non-transitory computer-readable storage medium coupled to the workload computing device and storing instructions which when executed by the workload computing device cause performing:
receiving, at the workload computing device, one or more data blocks from the source data repository necessary to run the workload computing process on the workload computing device;
receiving, at the workload computing device, one or more data blocks from the source data repository in a first background operation while the workload computing process runs on the workload computing device;
storing, at the target data repository, the one or more data blocks received in the first background operation;
determining that the one or more data blocks contained in the source data repository have been transferred from the source data repository to the target data repository;
in response to determining that the one or more data blocks contained in the source data repository have been transferred from the source data repository to the target data repository, switching the primary source of data of the workload computing process from the source data repository to the target data repository.

28. The system of claim 27, wherein the workload computing process comprises any of one or more virtual machines or an application container.

29. The system of claim 27, further comprising instructions which when executed by the workload computing device cause determining a data access pattern of the workload computing process, calculating a plurality of priority values for one or more different data blocks of the source data repository based on the data access pattern, and transferring the one or more different data blocks using the first background operation according to the priority values that have been calculated based on the data access pattern.

30. The system of claim 27, further comprising instructions which when executed by the workload computing device cause determining a data access pattern of the workload computing process, and based on the data access pattern, prioritizing transfers of one or more data blocks that correspond to particular files that are frequently accessed by the workload computing process.

* * * * *